United States Patent
Eydelie et al.

(10) Patent No.: US 6,967,554 B2
(45) Date of Patent: Nov. 22, 2005

(54) COIL FOR A ROTARY ELECTRIC MACHINE

(75) Inventors: Andre Eydelie, Saint-Yrieix (FR); Christophe Gilles, Angouleme (FR); Laurent Jadeau, La Rochefoucauld (FR); Philippe Augier, Champniers (FR); Jean-Marie Guillot, Blanzaguet-Saint-Cybard (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 10/117,032

(22) Filed: Apr. 8, 2002

(65) Prior Publication Data
US 2002/0148099 A1 Oct. 17, 2002

(30) Foreign Application Priority Data
Apr. 17, 2001 (FR) .................................. 01 05188

(51) Int. Cl.$^7$ ............................................. H01F 27/28
(52) U.S. Cl. ...................... 336/180; 336/188
(58) Field of Search ................. 336/188, 180, 336/183, 199, 90, 96; 29/564.6, 596; 310/179, 310/184, 43, 45

(56) References Cited

U.S. PATENT DOCUMENTS

| | | | | |
|---|---|---|---|---|
| 4,038,573 A | * | 7/1977 | Hillyer et al. | ................. 310/71 |
| 4,617,725 A | * | 10/1986 | Holter et al. | .................. 29/598 |
| 4,658,492 A | * | 4/1987 | Kieffer et al. | ............. 29/564.6 |
| 4,733,119 A | * | 3/1988 | Shiraki et al. | .............. 310/268 |
| 6,400,059 B1 | * | 6/2002 | Hsu | .......................... 310/254 |

FOREIGN PATENT DOCUMENTS

| | | |
|---|---|---|
| DE | 700 420 C | 11/1940 |
| EP | 0 891 030 A2 | 1/1999 |
| EP | 0891030 A2 * | 1/1999 |
| JP | A 2000-69705 | 3/2000 |
| JP | 2000-197294 * | 7/2000 |
| JP | A 2000-197294 | 7/2000 |

* cited by examiner

Primary Examiner—Tuyen T Nguyen
(74) Attorney, Agent, or Firm—Oliff & Berridge, PLC

(57) ABSTRACT

A coil for an electric rotary machine includes a substantially flat bundle of insulated wires wound around a winding axis so as to form a plurality of superposed turns, the cross-section of the bundle in the superposed turns having a long dimension that extends substantially perpendicularly to the winding axis of the coil.

18 Claims, 5 Drawing Sheets

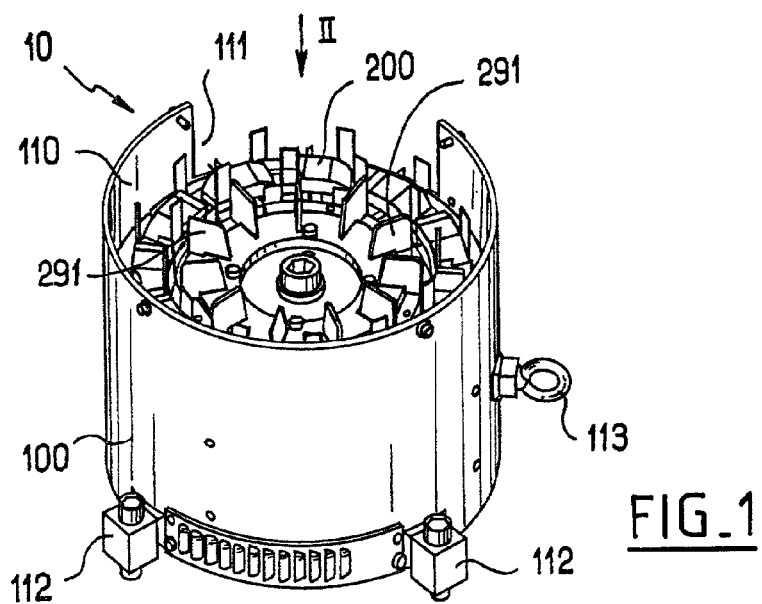
FIG_1
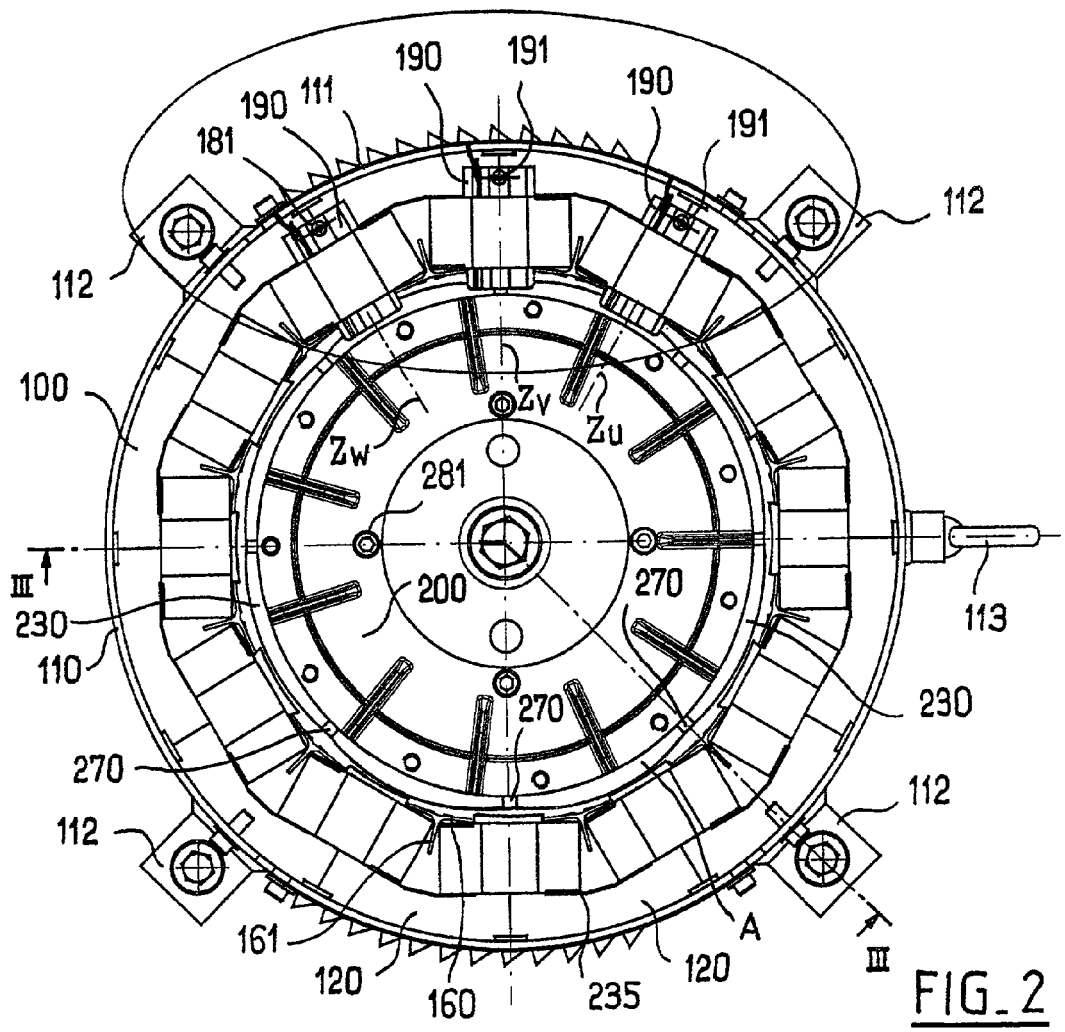
FIG_2

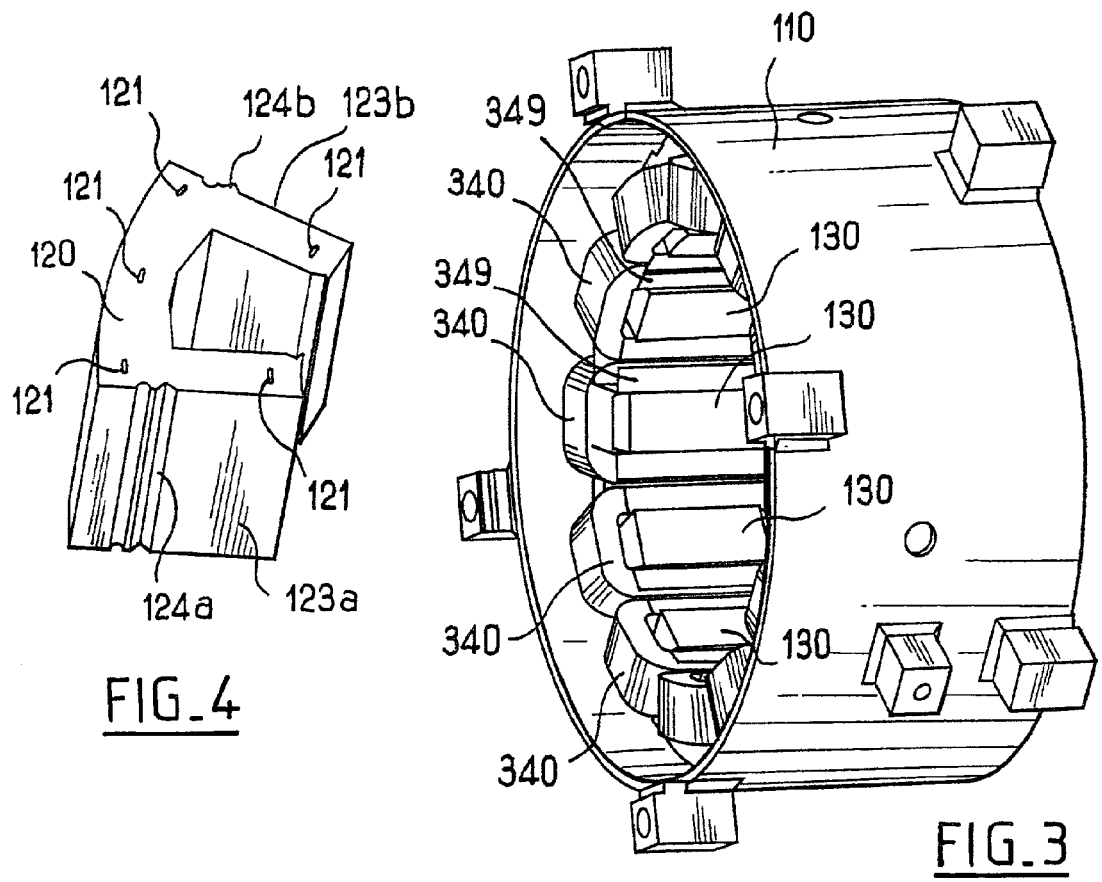
FIG_4
FIG_3
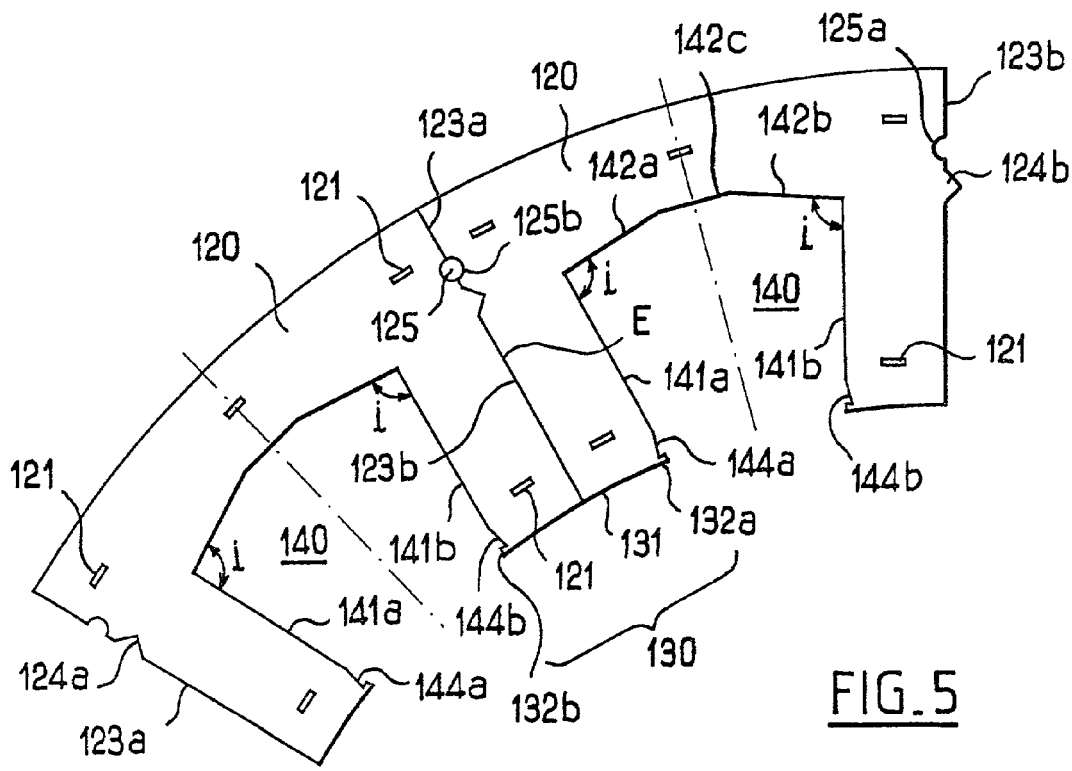
FIG_5

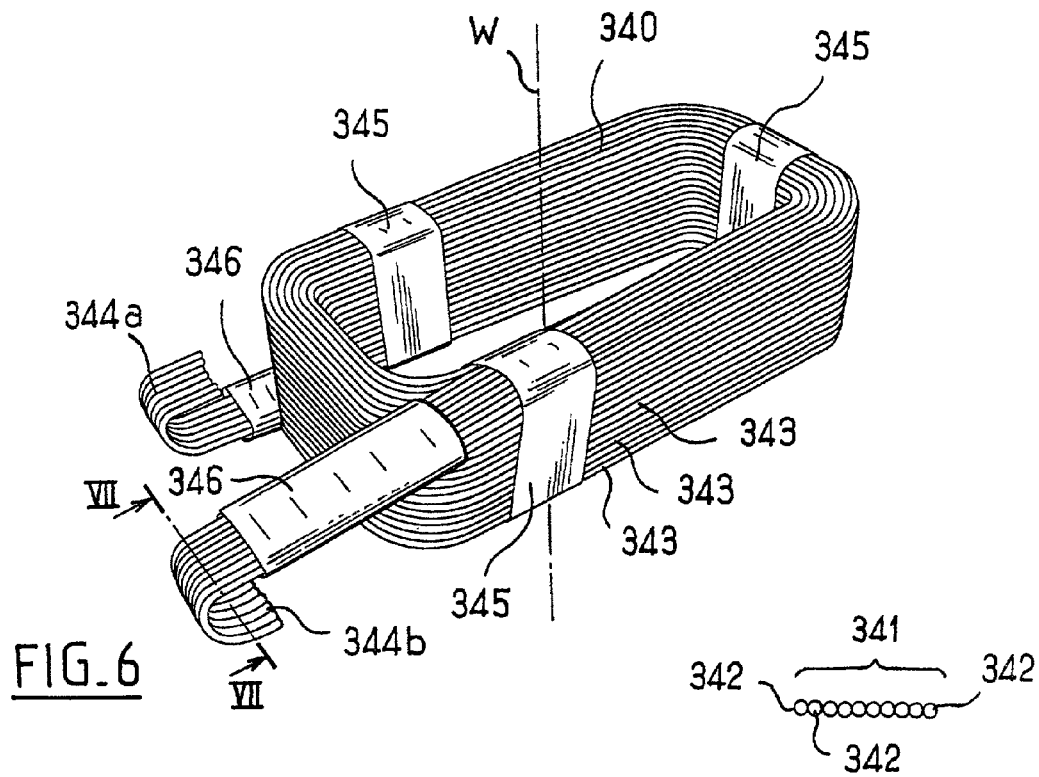
FIG. 6
FIG. 7
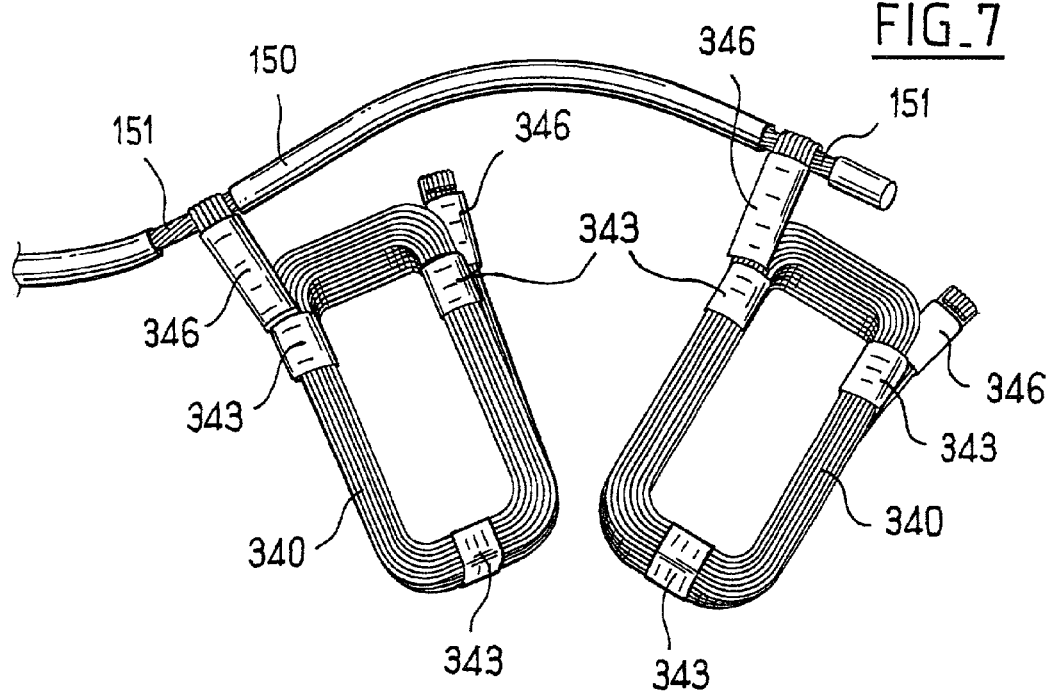
FIG. 8

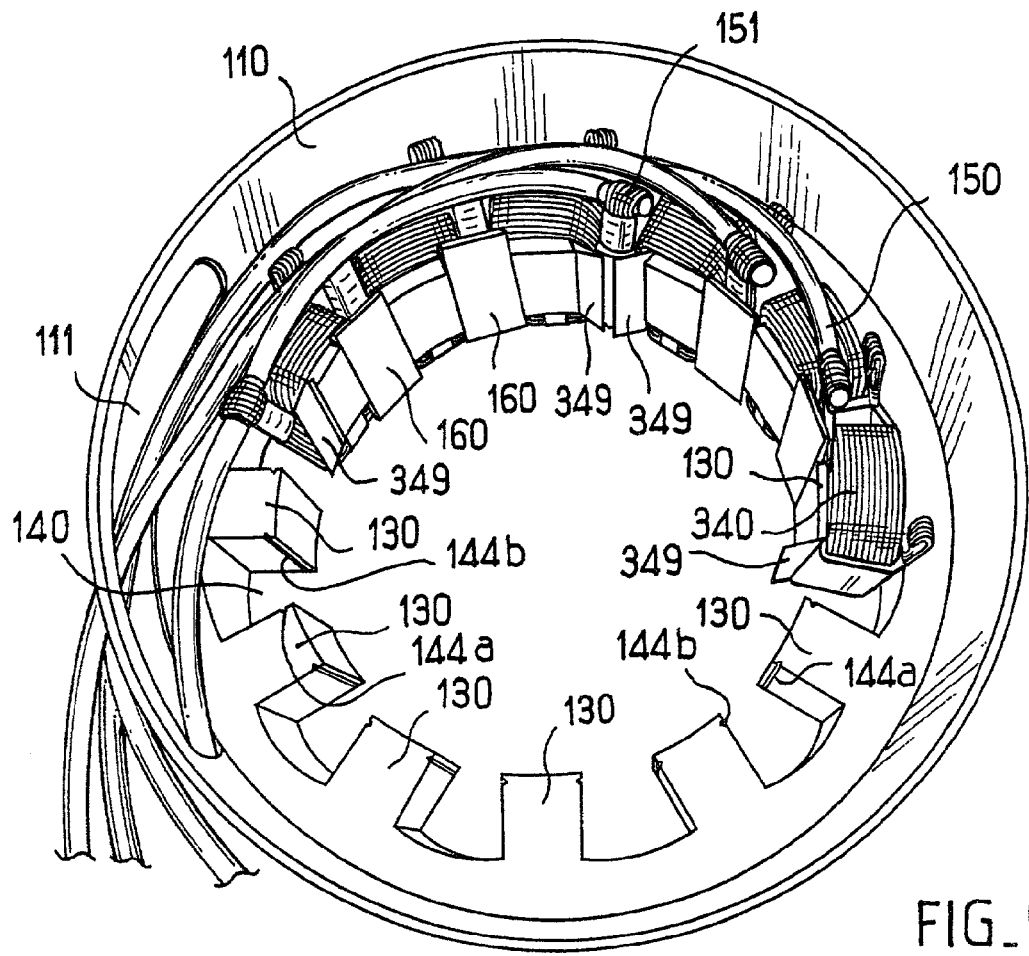
FIG_9
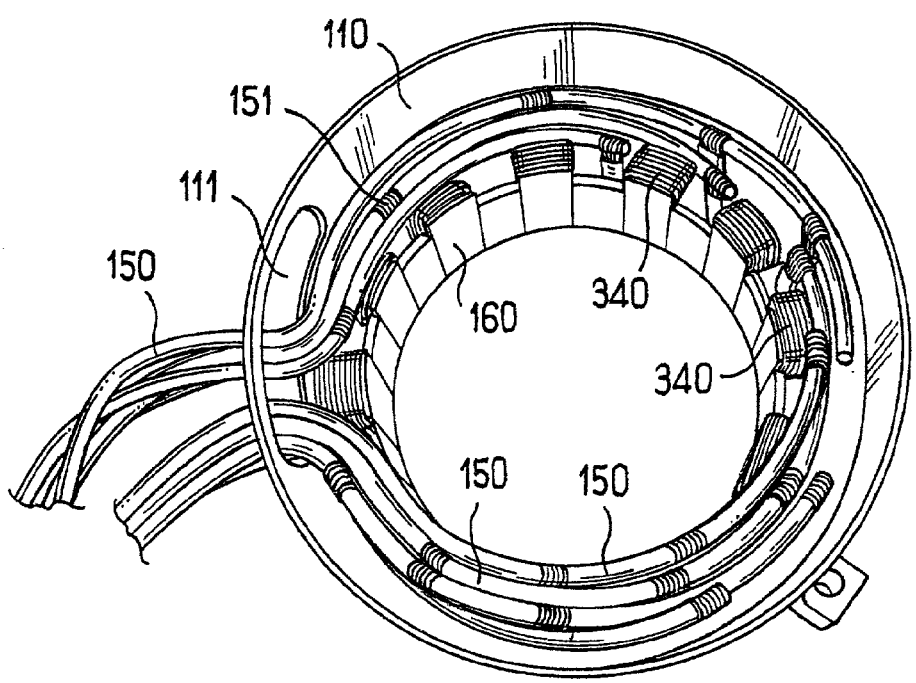
FIG_10

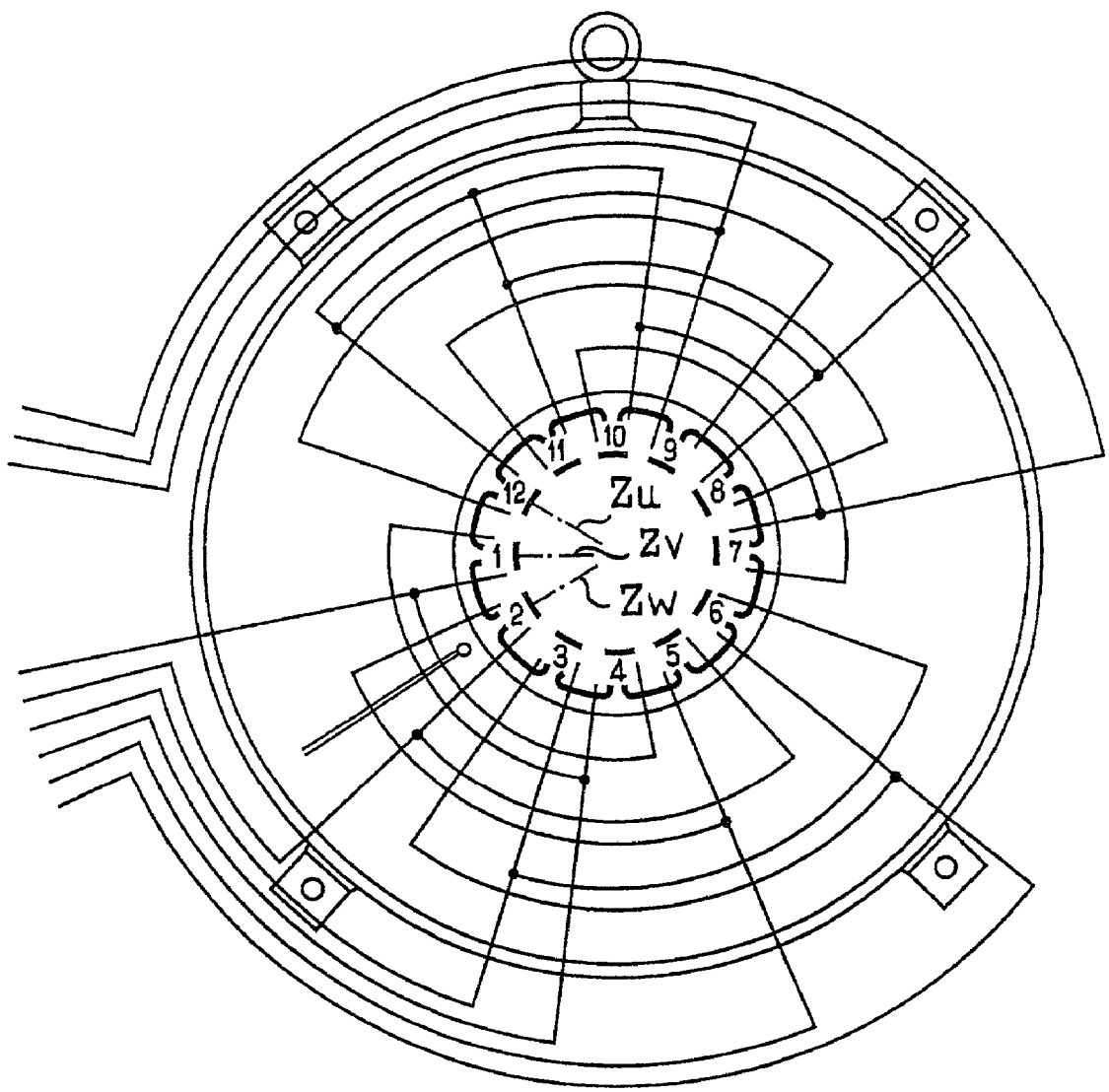
FIG_11

COIL FOR A ROTARY ELECTRIC MACHINE

FIELD OF THE INVENTION

The present invention relates to rotary electric machines and more particularly, but not exclusively, to synchronous motors.

OBJECTS AND SUMMARY OF THE INVENTION

The invention provides a coil used to make a rotary electric machine, said coil being designed to be engaged on a tooth of a stator magnetic circuit.

The coil of the invention may comprise a substantially flat bundle of insulated wires, wound around a winding axis so as to form a plurality of superposed turns. The cross-section of the bundle in the superposed turns may have a long dimension extending substantially perpendicularly to the winding axis of the coil. The inside section of the coil may be wider on one side than on the other.

The magnetic flux seen by each of the turns, as a result of the magnetic field lines along the tooth, may substantially be the same, thereby reducing the appearance of parasitic current circulation in the coil, and thus Joule effect losses, in particular at high speeds of rotation of the rotor.

In addition, the invention may enable a particularly compact stator to be made, since coils are used having heads that are short. Furthermore, the turns of the coil can be touching, thereby ensuring that the slots of the stator are well filled.

The wires used may advantageously be circular in section so as to make the winding operation easier, and have a diameter that lies in the range 0.3 millimeters (mm) to 2.5 mm.

The number of turns may not be less than 10, for example, and the number of wires in the bundle may lie in the range 3 to 20, for example. The inside section of the coil may, for example, be not less than several square centimeters ($cm^2$), e.g. about 10 $cm^2$.

In a particular embodiment, the inside section of the coil is substantially rectangular.

Still in a particular embodiment, the inside section of the coil is wider on one side than on the other so as to allow it to be mounted on a tooth of complementary profile with a certain amount of clamping. This clamping effect is particularly useful in contributing to ensuring that a pre-impregnated replacement coil does not move once it has been mounted on the stator, without it being necessary to re-impregnate the entire stator in an insulating resin. Thus, the coil can present an inside section having opposite non-parallel faces making an angle, the stator including teeth having opposite non-parallel faces making the same angle.

The wires of the bundle, stripped at their ends, are advantageously curved to form hooks that make it easy to connect them to the current-feed cables. In a particular embodiment, the hooks are directed towards the midplane of the coil, perpendicular to the winding axis.

The invention also provides a set of coils, comprising at least two coils, each electrically connected via one end to a sheathed electric cable, locally stripped at its connection with each coil.

The invention also provides a stator for a rotary electric machine, the stator comprising a magnetic circuit with teeth and having a plurality of coils as defined above, engaged on the teeth.

In a particular embodiment, the coils have an inside section of long side longer than the dimension of the teeth as measured along the axis of the stator, so as to leave a gap which is sufficient to receive a detector suitable for delivering a signal representative of rotation of the rotor.

The invention also provides a synchronous motor with a stator having coils as defined above.

The invention finds an advantageous application in machines comprising a stator wound on teeth, and a permanent-magnet and flux-concentrating rotor. In a stator with windings on teeth, each tooth serves as the core of a winding. In addition, the number of teeth $n_{teeth}$ is a function of the number of pairs of poles $n_{pairs}$ and the number of phases $n_{phases}$ preferably in compliance with the relationship $n_{teeth}=n_{pairs}*n_{phases}$. The combination of a flux-concentrating rotor and a stator with windings on teeth makes it possible to have a machine that is relatively powerful in a small volume, thus making it possible in particular to mount the motor in a cantilevered-out position at the end of a shaft, thereby reducing the number of bearings. In addition, the number of teeth and of coils can be relatively small, thereby facilitating manufacture and reducing the cost.

The invention also provides a method of repairing a stator for a rotary electric machine, the stator including coils as defined above, and the method comprising the following steps:

removing the faulty coil;

replacing it with a preimpregnated coil; and holding said coil stationary on the corresponding tooth by a wedging effect, as a result of the tooth being of non-constant width.

BRIEF DESCRIPTION OF THE DRAWINGS

Other characteristics and advantages of the present invention will appear on reading the following detailed description of non-limiting embodiments of the invention, and on examining the accompanying drawings, which drawings form an integral portion of the description, and in which:

FIG. 1 is a diagrammatic perspective view of a synchronous motor constituting an embodiment of the invention;

FIG. 2 is a diagrammatic plan view looking along arrow II of FIG. 1;

FIG. 3 shows the stator in isolation, in perspective, and in diagrammatic manner;

FIG. 4 shows a sector of the magnetic circuit of the stator in isolation and in perspective;

FIG. 5 shows how the FIG. 4 sector is assembled with an identical sector;

FIG. 6 shows an individual coil in isolation and in perspective;

FIG. 7 is a section on VII—VII of FIG. 6;

FIG. 8 is a diagram showing a set of coils used for making the stator;

FIG. 9 is a diagram showing how sets of coils are put into place on the stator during manufacture thereof;

FIG. 10 is a view analogous to FIG. 9, in highly diagrammatic and simplified form once all of the sets of coils have been put into place, to show the circular paths followed by the current-feed cables; and FIG. 11 is a diagram showing one way in which the coils can be electrically interconnected.

MORE DETAILED DESCRIPTION

FIGS. 1 and 2 show a synchronous motor 10 of the invention comprising a stator 100 and a rotor 200. The motor 10 is brushless, it has a flux-concentrating rotor, and its stator has windings on teeth, and it operates on three-phase AC.

The stator 100 has a steel case 110 with a lateral opening 111 in particular for passing electrical conductors for powering the stator windings. On the outside, the case is provided with fixing tabs 112 and with a hook 113 for hoisting purposes.

In the example shown, the stator 100 has a magnetic circuit that comprises a plurality of identical sectors 120, one of which is shown in isolation, in perspective in FIG. 4.

Each sector 120 is constituted by a stack of identical magnetic laminations that are superposed and clipped together so as to constitute a unitary assembly, with clipping being obtained using a conventional technique whereby each lamination is subjected to spot deformation at a plurality of assembly points 121. Using a stack of magnetic laminations serves to limit losses due to induced currents. In a variant, the magnetic circuit of the stator could be formed by superposing laminations, each of generally annular shape, and then cutting out all of the teeth 130 of the stator therefrom. In another variant, each of the sectors could include a plurality of teeth. When assembled together, two adjacent sectors 120 form a tooth 130, which tooth is used for receiving an individual coil 340, as can be seen in FIG. 3 in particular. The number of teeth $n_{teeth}$ in the example described is twelve, and the motor is designed to be powered with three-phase AC and the rotor has 8 poles. Naturally, the number of rotor poles could be different and in particular it could be equal to 12 or 16, for example. Although presenting certain drawbacks as mentioned above, the stator could also have a number of stator teeth that is not associated with the number of rotor pole pairs $n_{pairs}$ and the number of phases $n_{phases}$ by the relationship $n_{teeth}=n_{pairs}*n_{phases}$.

On its sides 123a and 123b for co-operating with adjacent sectors 120, each sector 120 has respective portions in relief 124a and 124b. These portions in relief 124a and 124b are complementary in shape having a profile that is generally triangular when seen from above, one being recessed and the other projecting, and having two sides that are substantially rectilinear and interconnected by a rounded portion. Co-operation between the portions in relief 124a and 124b contributes to positioning the sectors 120 properly relative to one another while assembling the magnetic circuit of the stator. Each sector 120 also has respective grooves 125a and 125b in its sides 123a and 123b, each groove being of semicircular cross-section and situated in the vicinity of the portions in relief 124a and 124b so that two adjacent grooves together form a hole 125 of circular section when the sectors 120 are assembled together. These holes 125 serve for receiving three detectors 190 as described in greater detail below.

In FIG. 5, it will be observed that the air-gap E at the interface between two adjacent sectors 120 occupies the middle of the corresponding tooth 130, thereby enabling magnetic losses to be reduced while the machine is in operation since magnetic flux can flow from one-half tooth to the adjacent half-tooth within the same sector 120 without encountering an air-gap.

The sectors 120 are forced as a whole into the cylindrical case 110, and the magnetic circuit formed by the sectors 120 is held together by the radial compression forces exerted by the case 110 on the sectors 120.

Each sector 120 defines a slot 140 whose opposite sides 141a and 141b are at an angle i of more than 90° relative to the adjacent regions 142a and 142b of the bottom of the slot 140, which regions are themselves perpendicular to radii passing through the line where the corresponding tooth meets the bottom of the slot. In the embodiment shown, the angle i is 90.4°, but this value is merely an example.

Each of the sides 123a and 123b of the sectors is generally in alignment with a radius, ignoring the portions in relief 124a, 124b, 125a, and 125b, and the width of each tooth 130 increases slightly on going away from the rotor (ignoring the cutouts 144a or 144b formed close to its free end 131 facing the rotor).

It will be observed on examining FIG. 5 that in the vicinity of its free end 131 each tooth 130 does not have pole swellings, in contrast to many known stators which are not of the type with windings on teeth. The free end 131 is a circularly cylindrical portion on the same axis as the axis of rotation of the rotor, and it is concave towards the rotor.

In the example shown, the end portions 132a and 132b of each tooth 130 situated between the free end 131 and the cutouts 144a or 144b are in alignment with the sides 141a and 141b respectively.

The bottom of each slot includes a middle region 142c interconnecting the regions 142a and 142b and perpendicular to a radius intersecting the slot 140 at half-width, as represented by chain-dotted lines in FIG. 5.

As mentioned above, each tooth 130 receives an individual coil 340 occupying substantially half of the volume of each of the slots 140 adjacent to the tooth 130 in question.

FIG. 6 shows an individual coil 340 in isolation. This coil is formed by winding a bundle 341 of enameled electric wires 342 around a winding axis W, the bundle being substantially flat in cross-section, as can be seen in FIG. 7.

When the bundle 341 is observed in cross-section through the turns, its long dimension extends substantially parallel to the winding axis W.

In the example shown, the bundle 341 has ten individual conductors 342, each of circular section. The bundle 341 forms about twenty superposed turns 343. Within the turns, the conductors 342 are electrically insulated from one another by using wire that is enameled. The conductors 342 are stripped at their ends to form electrical connection ends 344a and 344b, each of which is curved towards the midplane of the coil perpendicular to the winding axis W so as to form a hook. At the end of the coil manufacturing process, each of these hooks is open towards the body of the coil.

FIG. 6 shows that all of the conductors 342 at the end 344a are curved upwards and then towards the body of the coil, while the end wires 344b are curved downwards and then towards the body of the coil. The ends 344a and 344b do not project significantly beyond the planes of the two end faces of the coil. The turns constituting the coil body can be held in the superposed state by adhesive strips of cloth 345 prior to being impregnated in resin. Sleeves 346 of insulating sheath are engaged on the portions of the bundle 341 that extend between the ends 344a, 344b and the body of the coil.

The inside section of the coil 340 is generally rectangular in shape, as can be seen in FIG. 8. The coils 340 are wound on formers having two opposite large faces that are plane, making between them the same angle as between the sides 141a and 141b of a tooth, such that the width of the inside section of each coil varies perceptibly from one end face to the opposite face. This can be perceived if any attempt is made to mount a coil the wrong way round on a tooth 130 of the stator 100.

In FIG. 8, it can be seen that the coils 340 are electrically connected via one or other of the electrical connection ends 344a or 344b to partially-stripped sheathed electrical conductors 150 prior to being mounted on the teeth 130 of the stator 100. The hooks formed by the ends 344a and 344b are arranged in such a manner as to fit substantially around the outside diameter of the electrical conductors 150 in the stripped portions 151. These stripped portions can be formed not only at the ends of the electrical conductors 150 but also between them, by removing a limited length of insulating plastics material sheath.

In the example described, sets of two coils 340 are made up and subsequently mounted on the corresponding teeth 130, as shown in FIG. 9. Sheets 349 of insulation are interposed between the teeth and the bottoms of the slots and the coils. The ends of these sheets 349 can be seen in FIG. 5.

As more and more coils 340 are mounted on the teeth 130, pieces of support shim 160 are slid into the cutouts 144$a$, 144$b$ so as to close off the slots 140. These pieces of shim 160 include partitions 161 extending between the portions of the two coils 340 that are received in the corresponding slot 140.

Once all of the coils 340 are in position, the cables 150 extend along substantially circular paths on one side of the magnetic circuit of the stator, being set back from the free ends 131 of the teeth, as shown in FIG. 10, these cables being attached to one another by collars, and then the stator is impregnated with an insulating resin in conventional manner. The electrical interconnections between the twelve coils is shown in FIG. 11.

It will be understood that it is particularly advantageous to use individual coils 340 installed in the manner described above, since that makes it much easier to replace coils 340. To replace a coil 340, once the rotor 200 has been removed, it suffices to unsolder the ends 344$a$ and 344$b$ of a coil from the corresponding stripped portions 151 and to remove the pieces of shim 160 concerned, whereupon the coil 340 can be extracted. A resin-impregnated replacement coil 340 can then be put into place by being engaged on the previously released tooth 130, after which its ends 344$a$ and 344$b$ can be soldered to the stripped portions 151. A repair can be performed on site without it being necessary to return the machine to the manufacturer, and without it being necessary to re-impregnate the stator, thus making it possible to shorten repair time. The convergence of the sides 141$a$ and 141$b$ of the tooth 130 towards the rotor and the corresponding shape of the inside section of the coil contribute to preventing the coil from moving on the tooth 130. The motor 10 can advantageously be shipped together with one or more preimpregnated replacement coils 340.

The rotor 200 is a flux-concentrating rotor and comprises eight radially extending magnets 270 disposed between pole pieces 230. The magnets 270 are magnetized transversely.

The end cheek-plates are fixed to the shaft of the rotor at opposite ends thereof to prevent the pole pieces 230 and the magnets 270 from moving axially. The cheek-plates define a stage of the machine. The rotor 200 can have a plurality of stages subdivided, and the number of magnets 270 per stage can lie in the range 4 to 64, for example, possibly being equal to 8 as in the example shown for an 8-pole motor. When a plurality of stages are used and are separated by intermediate cheek-plates, the number of cheek-plates is preferably equal to the number of stages plus one.

The cheek-plates can be made of aluminum, for example, or out of non-magnetic steel. Tapped holes 500 are made through the peripheries of the cheek-plates so as to enable balancing screws to be engaged.

As can be seen in FIG. 2, in particular, one of the cheek-plates has a circular radially outer edge which is set back from the radially outer edge of the pole pieces 230 and the radially outer edges of the magnets 270.

An annular zone A is thus provided around the cheek-plate in which it is possible to read the magnetic field of the magnets 270 of the rotor by means of detectors 190 of the kind shown in FIG. 2.

In the embodiment described, there are three detectors 190, since the motor is a three-phase motor, with each detector comprising a Hall effect sensor arranged to detect the magnetic field over the peripheral region A of the rotor 200 around an end cheek-plate. The magnetic field is read along an axis parallel to the axis of rotation of the rotor, the Hall effect sensor overlapping the peripheral region A. In the example shown, the detectors 190 are mounted on three consecutive teeth 130 situated in the vicinity of the opening 111.

Each detector 190 is fixed by a screw 191 on a tooth 130 of the stator, said screw 191 being engaged in a hole 125. Each detector 190 extends along the radial axis $Z_u$, $Z_v$, or $Z_w$ of the associated tooth and passes through the coil 340 engaged on that tooth. The coils 340 are provided for this purpose with an inside section of length that is large enough to enable the detector 190 to be passed. The space left between a coil and the corresponding tooth for passing the detector can be about 5 mm, for example, with such a space serving to insulate the coil from the tooth where there is no insulation 349.

It is advantageous to read the magnetic field of the permanent magnets 270 directly because that makes it possible to avoid adding special elements to the rotor whose sole purpose is to enable the angular position of the rotor to be read. This simplifies manufacture of the rotor and improves reliability. In addition, mounting detectors 190 in the gap between the coils 340 and the teeth 130 is particularly compact, while nevertheless providing easy access to the detectors 190 in order to replace them, should that be necessary.

Each detector 190 is positioned inside a coil 340 of given phase, the three detectors 190 being associated with coils of different phases, disposed on teeth having radial axes $Z_u$, $Z_v$, or $Z_w$, as can be seen in FIG. 2. Each detector 190 makes it possible to detect which polarity of the rotor lies in register with the associated coil (and thus the corresponding phase) at a given instant. Each detector 190 has an electronic circuit for shaping the signals delivered by the Hall effect sensors so as to reduce sensitivity to interference. Depending on the position of the rotor, the various signals delivered by the detectors 190 can take up six possible combinations, each change in the triplet constituted by the states of the detectors 190 corresponds to a determined angular position of the rotor. This makes it possible to determine the angular position of the rotor at precise instants, and to compute the position of the rotor between these instants by interpolation, given knowledge of its speed. The coils 340 can thus be excited in optimum manner with the desired amount of phase shift.

On at least one of its end cheek-plates, the rotor 200 has cooling fins 291 which can be seen in FIG. 1, in particular. It will be observed that an additional cooling effect is obtained by the presence of the lobes 235 formed by the pole pieces 230 at the periphery of the rotor, which make it possible to generate a flow of cooling air within the inside of the motor and reduces torque ripple.

The invention makes it possible to manufacture rotary electric machines from a range of stator and rotor magnetic circuits that are prefabricated, of different diameters, with the stators presenting teeth that are standard. The axial dimensions of the magnetic circuits of the rotor and of the stator can be selected as a function of the power to be delivered, by stacking a larger or smaller number of sectors and of pole pieces. Only the coils need to be made to measure for a stator magnetic circuit built up from prefabricated elements, by determining the number of turns in the coil, the diameter of the conductor wires in its flat bundle, and the number of said wires, as a function of the performance required by the user of the machine.

The invention is not limited to a synchronous motor and it is also applicable to manufacturing a generator. The rotor can be internal or external.

The electrical power of the machine can lie in the range 1 kilowatt (kW) to 750 kW, for example. The speed of rotation of the rotor can lie in the range 1000 rpm to 10,000 rpm, for example. A machine of the invention can also find applications when speed is below 1000 rpm. The outside diameter of the machine can lie in the range 50 mm to 1 meter (m), for example; in the most widespread applications, the outside diameter can lie in the range 100 mm to 600 mm.

The invention is not limited to some particular number of poles nor is it limited to the stator being powered with three-phase AC. Electricity can be polyphase having $n_{phases}$ phases, where n is not equal to three.

What is claimed is:

1. A coil for an electric rotary machine, the coil comprising a substantially flat bundle made of a plurality of insulated wires wound around a winding axis so as to form a plurality of superposed turns, the bundle having a cross-section in the superposed turns which has a long dimension that extends substantially perpendicularly to the winding axis of the coil, and the coil having a first end, and a second end that is spaced from the first end in a direction of the winding axis, an inside section of the coil perpendicular to the winding axis on a first end being wider than an inside section of the coil perpendicular to the winding axis on the second end.

2. A coil according to claim 1, wherein each said wire of the bundle is of circular cross-section.

3. A coil according to claim 1, wherein said wires are enameled.

4. A coil according to claim 1, wherein said wires have a diameter which lies in the range 0.3 mm to 2.5 mm.

5. A coil according to claim 1, wherein an inside section of the coil perpendicular to the winding axis is substantially rectangular.

6. A coil according to claim 1, wherein said wires of the bundle are stripped at their ends and curved to form hooks.

7. A coil according to claim 6, wherein said coil has a midplane perpendicular to said winding axis, and said hooks are directed towards said midplane of the coil.

8. A coil according to claim 1, wherein said coil is connected to a sheathed electric cable that is partially stripped at the connection with the coil.

9. A rotary electric machine stator comprising a magnetic circuit with teeth and having a plurality of coils comprising a substantially flat bundle made of a plurality of insulated wires wound around a winding axis so as to form a plurality of superposed turns, the bundle having a cross-section in the superposed turns which has a long dimension that extends substantially perpendicularly to the winding axis of the coil, and each coil being engaged on a respective tooth of the magnetic circuit, wherein a tip of said plurality of insulated wires is stripped and formed into a hook, and said hook is configured to attach to an electric connector.

10. A rotary electric machine according to claim 9, comprising at least two coils, and each coil being electrically connected via said hook to a sheathed electric cable, locally stripped at the connection with each hook.

11. A set of coils according to claim 10, wherein the sheathed electric cable comprises a sheathed portion between two stripped portions.

12. A set of coils according to claim 10, wherein the sheathed electric cable comprises at least three stripped portions.

13. A set of coils according to claim 10, wherein the sheathed electric cable comprises a sheath of insulating plastics material.

14. A stator according to claim 9, wherein the coils have an inside section of long side longer than the dimension of the teeth as measured along the axis of the stator, so as to leave a gap which is sufficient to receive a detector suitable for delivering a signal representative of rotation of the rotor.

15. A stator according to claim 14, wherein the coils each present an inside shape having opposite non-parallel faces making an angle, and wherein the stator includes teeth, each tooth having opposite non-parallel faces making the same angle.

16. A method of repairing a rotary electric machine stator including a magnetic circuit with teeth and having a plurality of coils including a substantially flat bundle made of a plurality of insulated wires wound around a winding axis so as to form a plurality of superposed turns, the bundle having a cross-section in the superposed turns which has a long dimension that extends substantially perpendicularly to the winding axis of the coil, and each coil being engaged on a respective tooth of the magnetic circuit, the method comprising:

removing a faulty coil;
replacing said coil with a preimpregnated coil; and
holding said preimpregnated coil stationary on a corresponding tooth by a wedging effect.

17. A coil for an electric rotary machine, the coil comprising a substantially flat bundle made of a plurality of insulated wires wound around a winding axis so as to form a plurality of superposed turns, the bundle having a cross-section in the superposed turns which has a long dimension that extends substantially perpendicularly to the winding axis of the coil, the turns being held in the superposed state by adhesive strips prior to being impregnated in resin, and the turns and the adhesive strips thereafter being impregnated in resin.

18. A coil according to claim 17, further comprising sleeves of insulating sheath engaged on portions of the bundle that extend between ends of the bundle and the superposed turns.

* * * * *